United States Patent

[11] 3,610,709

| [72] | Inventor | Ernest Leonard Allen<br>Dunstable, England |
|---|---|---|
| [21] | Appl. No. | 862,315 |
| [22] | Filed | Sept. 30, 1969 |
| [45] | Patented | Oct. 5, 1971 |
| [73] | Assignee | Rotax Limited<br>London, England |
| [32] | Priority | Oct. 10, 1968 |
| [33] | | Great Britain |
| [31] | | 48028/68 |

[54] BALL SPLINES
6 Claims, 3 Drawing Figs.

[52] U.S. Cl. .................................................. 308/6 C
[51] Int. Cl. ................................................. F16c 19/00, F16c 29/00
[50] Field of Search ........................................... 308/6 C, 6; 64/23.7

[56]                  References Cited
                UNITED STATES PATENTS
2,452,117  10/1948  Ferger ........................  308/6 C
3,045,457   7/1962  Blanchard et al. ............  308/6 C

*Primary Examiner*—Martin P. Schwadron
*Assistant Examiner*—Barry L. Grossman
*Attorney*—Holman, Glascock, Downing and Seebold

ABSTRACT: A ball spline having an inner grooved member and an outer member comprising a casing which has an inner cylindrical surface. The outer member also including a plurality of segmental pieces which are located against the inner cylindrical surface of the casing, each segmental piece having a groove formed therein and which can be aligned with the grooves in the inner member to define registering grooves for rows of balls. Each segmental piece also being recessed at one of its axially extending edges to define a return passage for the balls. The segmental pieces being of an arcuate dimension such that a small gap exists between adjacent pieces whereby the pieces can be aligned prior to being secured to the casing.

PATENTED OCT 5 1971

3,610,709

INVENTOR
Ernest Leonard Allen
BY Holman, Glascock,
Downing & Seebold
ATTORNEYS

BALL SPLINES

This invention relates to ball splines of the kind comprising a generally cylindrical inner member and a hollow generally cylindrical outer member, the members being movable relative to each other in an axial direction, and of least three rows of balls serving to position the inner member within the outer member.

The object of the invention is to provide such a ball spline in a simple and convenient form.

Figure 1:
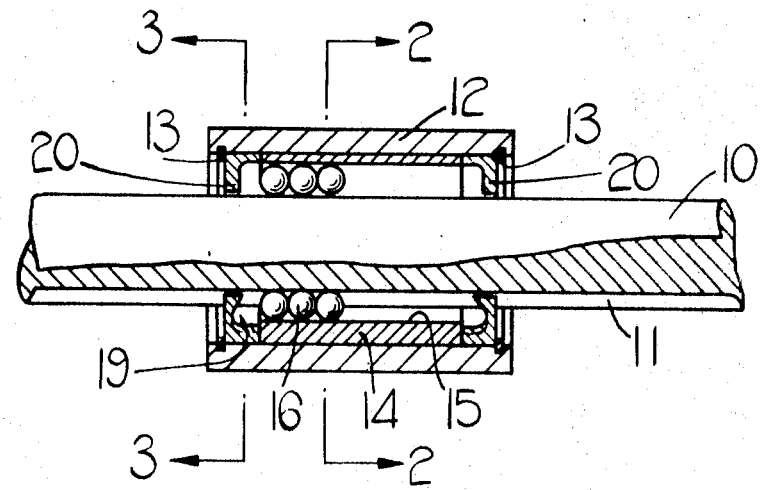
Figure 2:
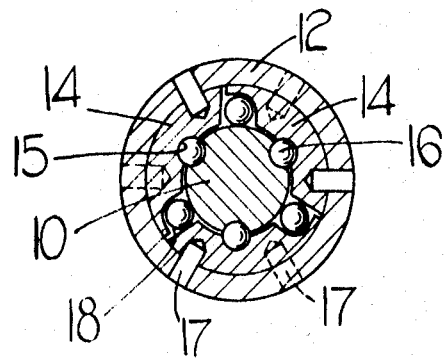
Figure 3:
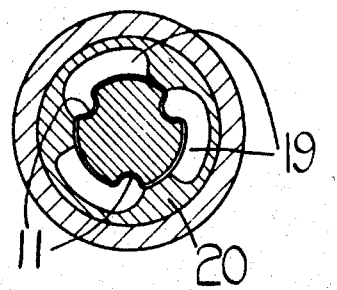

In the accompanying drawings:

FIG. 1 is a sectional side elevation of one example of a ball spline in accordance with the invention, FIG. 2 is a section on the line 2—2 FIG. 1 and FIG. 3 is a section on the line 3—3 FIG. 1.

With reference to the drawings there is provided an inner member 10 which is of cylindrical form and having formed in its periphery three equiangularly spaced axially extending grooves 11. Also provided is an outer member which comprises a hollow cylindrical casing 12 having a pair of circumferential grooves 13 formed in the internal peripheral surface thereof adjacent the end respectively.

Mounted within the casing are three segmental pieces 14 which are located against the internal peripheral surface of the casing. The arcuate lengths of the segmental pieces 14 are such that when they are located in position against the internal peripheral surface of the casing, small gaps are left between adjacent pieces.

Each piece 14 has formed on its inner arcuate surface an axially extending groove 15 and these grooves are positioned to register with the grooves 11 formed on the inner member. Three pairs of registering grooves are thus formed and each pair of registering grooves accommodates a row of balls 16. When the balls are in position the pieces 14 are secured relative to the casing 12 by means of pairs of pins 17 or any other suitable means, extending through the casing into the pieces and in this manner the pieces 14 can be accurately located prior to securing them within the casing.

Each segmental piece 14 is provided with a recess 18 at one of its axially extending edges and in conjunction with the adjacent piece and the adjacent plain cylindrical surface of the inner member 10 the recess 18 defines a return passage for the balls. The adjacent ends of the return passage and the pair of registering grooves with which the return passage is associated are interconnected by way of channels 19 respectively formed in a pair of end caps 20 situated at the opposite ends respectively of the casing. The end caps 20 are retained in position by circlips (not shown) respectively located in the circumferential grooves 13. During relative axial movement of the inner and outer members the balls leaving the pairs of registering grooves pass into the associated return passages and are returned to the opposite ends of the respective pairs of registering grooves. In this manner recirculation of the balls occurs as the members move relative to each other.

This particular construction overcomes the difficulty experienced in manufacturing the outer member as a solid piece. Furthermore, the pairs of registering grooves can be accurately aligned to take into account any small manufacturing discrepancies which may have arisen. The aforesaid pieces will be made of high grade material but the casing can be made of a low grade material. Previously the whole of the outer member has been formed from high grade material. The end caps 20 can be made of any convenient material such for instance as a synthetic resin.

Having thus described my invention what I claim as new and desire to secure by Letters Patent is:

1. A ball spine of the kind comprising a generally cylindrical inner member, a hollow generally cylindrical outer member surrounding the inner member, said members being movable relative to each other in an axial direction, at least three rows of balls serving to position the inner member within the outer member, said outer member comprising a hollow casing having a cylindrical inner surface, a plurality of segmental pieces located against said surface, an axial groove formed in each of said segmental pieces, a plurality of grooves formed on the inner member and aligned with the grooves in the segmental pieces, said grooves defining a plurality of pairs of registering grooves, each pair of registering grooves accommodating one of the rows of balls.

2. A ball spline as claimed in claim 1 in which gaps exist between adjacent segmental pieces to permit correct alignment of the pieces prior to securing them to the casing.

3. A ball spline as claimed in claim 2 in which each segmental piece is provided with an axial recess at one of its axially extending edges said recess together with the axially extending edge of the adjacent piece together with the surface of the inner member defining a return passage for the balls and a pair of end caps at the opposite ends of the casing respectively said end caps having channels formed therein which provide communication between the ends of the registering grooves and the adjacent ends of the respective return passages.

4. A ball spline as claimed in claim 2 in which each segmental piece is provided with a further groove which defines a return passage for the balls, there being provided at the opposite ends of the casing respectively a pair of end caps, said end caps having channels formed therein which provide communication between the ends of the registering grooves and the adjacent ends of the respective return passages.

5. A ball spline as claimed in claim 3 including circumferential grooves formed in the inner periphery of the casing, circlips located within said circumferential grooves, the end caps being retained in position by said circlips.

6. A ball spline as claimed in claim 4 including circumferential grooves formed in the inner periphery of the casing, circlips located within said circumferential grooves, the end caps being retained in position by said circlips.